United States Patent [19]
Bacher et al.

[11] Patent Number: 5,102,326
[45] Date of Patent: Apr. 7, 1992

[54] APPARATUS FOR PROCESSING SYNTHETIC PLASTICS MATERIAL

[76] Inventors: Helmut Bacher, Mittelpromenade 6, Puchenau, Austria, A-4040; Helmuth Schulz, Enzing 19, St. Florian, Austria, A-4090; Georg Wendelin, Am Hartmayrgut 5, Linz, Austria, A-4040

[21] Appl. No.: 758,377

[22] Filed: Sep. 3, 1991

Related U.S. Application Data

[63] Continuation of Ser. No. 392,618, filed as PCT/AT87/00057, Oct. 9, 1987, abandoned.

[30] Foreign Application Priority Data

Oct. 10, 1986 [AT] Austria ...................... A2701/86

[51] Int. Cl.$^5$ ............................................ B29C 47/10
[52] U.S. Cl. ...................................... 425/202; 264/37; 366/77; 425/205
[58] Field of Search ............... 425/447, 200, 448, 449, 425/580, 582, 584, 585, 305.1, 202, 205; 366/97, 186; 241/209, 214, 215, 254, 286, 278 R, 292.1, 294; 264/211.1, 349, 37, DIG. 69

[56] References Cited

U.S. PATENT DOCUMENTS

| | | | |
|---|---|---|---|
| 3,155,376 | 11/1964 | Möllenbruck | 366/77 |
| 3,343,212 | 9/1967 | Adams | 264/211.1 |
| 3,488,416 | 1/1970 | Rothschild | 264/211.1 |
| 3,593,929 | 7/1971 | Hughes | 241/278 R |
| 4,120,460 | 10/1978 | Bacher | 241/278 R |
| 4,175,814 | 11/1979 | Ozasa et al. | 241/254 |
| 4,189,291 | 2/1980 | Longhi | 264/37 |
| 4,222,728 | 9/1980 | Bacher et al. | 425/378.1 |
| 4,460,277 | 7/1984 | Schulz et al. | 425/202 |
| 4,894,001 | 1/1990 | Petschner | 366/186 |

FOREIGN PATENT DOCUMENTS

| | | | |
|---|---|---|---|
| 123771 | 11/1984 | European Pat. Off. | |
| 55-109622 | 8/1980 | Japan | 264/37 |

OTHER PUBLICATIONS

McCabe and Smith *Unit Operations of Chemical Engineering*, McGraw-Hill Book Company: New York, NY, 1956, pp. 287-289.

*Kirk-Othmer Concise Encyclopedia of Chemical Technology*, Grayson, Editor, John-Wiley and Sons: New York, NY, 1985, pp. 1074-1077.

*Primary Examiner*—Jay H. Woo
*Assistant Examiner*—W. J. Matney, Jr.
*Attorney, Agent, or Firm*—Townsend and Townsend

[57] ABSTRACT

An apparatus for processing thermoplastic synthetic plastic material includes a receptacle in which a rotating tool circulates around an axis. The axis of rotation may be offset with respect to the axis of the receptacle by a predetermined amount. From the receptacle, the comminuted material is conveyed by the rotating tool into the inlet opening of a screw-type extruder which has an axis that is offset relative to a parallel radius of the receptacle. The offset arrangement allows the rotating tool improves the flow of the processed material into the screw-type extruder.

7 Claims, 2 Drawing Sheets

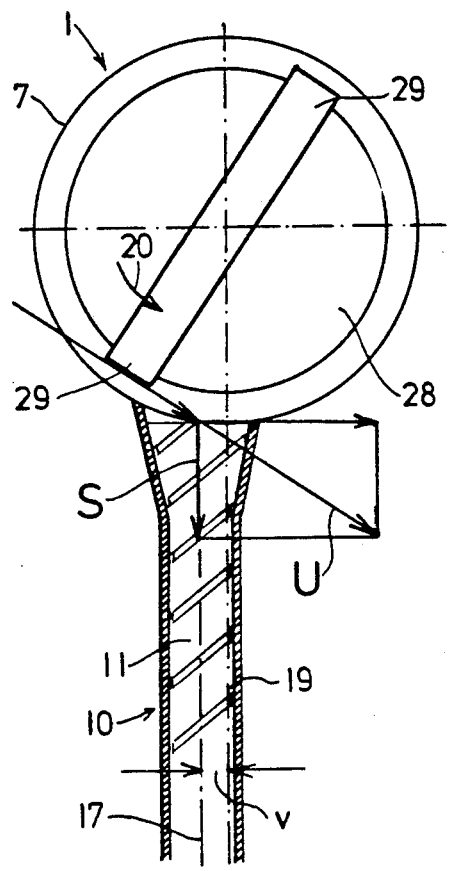
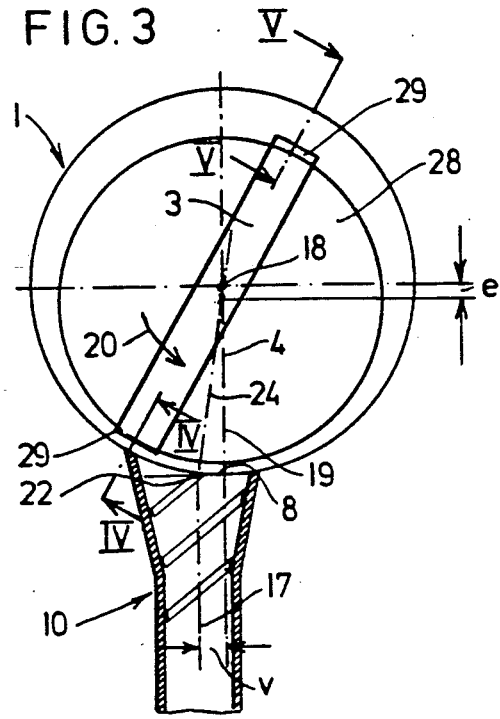
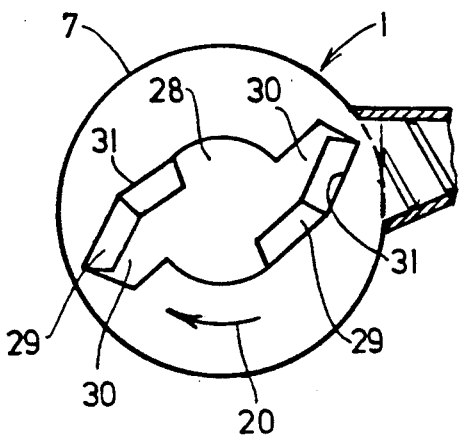
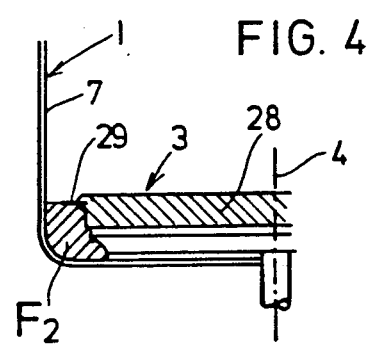
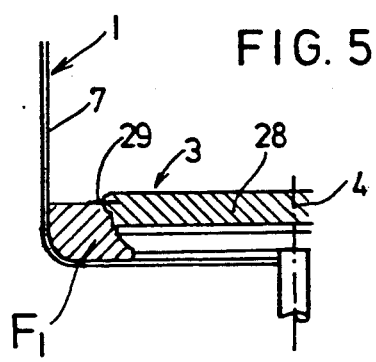

APPARATUS FOR PROCESSING SYNTHETIC PLASTICS MATERIAL

This is a continuation of application Ser. No. 07/392,618, filed as PCT/AT87/00057, Oct. 9, 1987, now abandoned.

BACKGROUND OF THE INVENTION

The invention refers to an apparatus for processing synthetic plastics material, in particular thermoplastic synthetic plastics material, comprising a receptacle, in the bottom region of which a comminuting and mixing tool is disposed rotatably around a substantially vertical rotation axis, and a screw-type extruder conveying the material out of the receptacle, the inlet opening for the material of this screw-type extruder being disposed at one front side of the screw and being formed by an opening in the side wall of the receptacle, which opening is disposed substantially at the level of the comminuting and mixing tool, no or no substantial parts of the screw-type extruder protruding from the inner wall of the receptacle.

Such apparatus are known (EP-A 123,771). The synthetic plastics material delivered to the receptacle is comminuted by the rotating comminuting and mixing tool and is brought into a vortex circulation, the synthetic plastics material being heated by the thereby exerted cutting and friction energy. Since big, not comminuted parts are heated more than already comminuted material, a mixture with sufficient good thermic homogenity results during the comminuting and mixing process. This mixture is conveyed out from the receptacle by the screw-type extruder and is plasticized thereby. Disposing the screw type extruder at the level of the comminuting and mixing tool is substantially more favourable than another known disposition in which the screw-type extruder is disposed spaced above this tool, a guide wall protruding inwardly from the inner wall of the receptacle guiding the circulating material into the inlet opening of the screw-type extruder, because the latter embodiment implies a multiple turning of the comminuted material before it can be catched by the screw. Further, the screw protruding into the interior of the receptacle as well as the guiding wall disturb the vortex circulation, which results in an inhomogeneous mixture and causes the danger of blocking the rotating tool, particularly when treating big particles of the material.

Within another known apparatus (FR-A 2,418,707) the screw-type extruder is disposed tangentially with respect to the receptacle. The inlet opening for the material is disposed substantially in the center of the length of the housing of the screw, which results in the disadvantage that catching the material by the screw-type extruder is not assisted by the centrifugal forces acting on the particles of the material, because the particles of the material must change their moving direction nearly perpendicularly. Further, this embodiment shows substantial dead corners, in which the material can gather and may block the rotation of the tool.

The initially described known embodiment in which the axis of the screw is disposed radially with respect to the receptacle, shows a sufficient filling of the screw for material which can be charged well. In many cases, however, an increased filling of the screw is desired, particularly then, if stretched, very strong synthetic plastics materials shall be treated or such kinds of synthetic plastics material which must not be pre-densified by heat influence due to their heat sensitiveness in the presence of oxygen. It would be imaginable to get an increased screw filling by providing a large conus-like enlargement of the intake section of the screw, however this results in high costs for the screw provided with a large diameter and in an increased wear of it due to the increased circumference velocity.

Another possibility known from the initially described embodiment consists in assisting the supply of the material into the inlet opening of the screw-type extruder by providing the comminuting and mixing tools with a sickle-shaped, backwardly curved shape so that they act like a spatula, the material thereby being forced into the inlet opening of the screw housing to an increased extent. However, also this is not sufficient when treating certain kinds of materials.

SUMMARY OF THE INVENTION

The invention deals with the task of increasing the cramming effect exerted by the rotating comminuting and mixing tool onto the comminuted materials with a low expenditure, without increased wear in comparison with the initially described known construction. The invention solves this task with a modified apparatus. The longitudinal extension of the axis of the screw does not intersect the axis of the receptacle but, however, intersects the interior thereof. The axis of the screw is offset with respect to the radius of the receptacle and has the opposite direction relative to the moving direction of the comminuting and mixing tool passing the screw. Therefore, the screw of the screw-type extruder is not disposed exactly radial with respect to the receptacle, but is displaced towards the arriving side (with respect to the rotating tool). This causes an increase of the stuffing effect by which the material is conveyed by the rotating tool into the housing of the screw-type extruder through the intake opening thereof. The said offsetting of the screw axis, namely, causes that (in comparison to the initially described known construction) a greater component of the peripheral vector, measured in axial direction of the screw, and of the stuffing force resulting therefrom is made effective. Particularly favourable conditions occur within the spirit of the invention, if the point of intersection of the axis of the screw with the inner wall of the receptable is offset with respect to that radial direction of the receptacle being parallel to the screw direction by 5° to 20°, particularly by 10° to 15°, in direction opposite to the moving direction of the comminuting and mixing tool.

A further increase of the stuffing effect can be achieved within the scope of the invention by the fact that the rotation axis of the comminuting and mixing tool is disposed eccentrically with respect to the axis of the receptacle, and this in direction towards the inlet opening of the screw-type extruder. Thereby results an increase of the compression acting on the comminuted material in the region of the inlet opening of the screw-type extruder, which is useful for conveying the material into this opening. In this connection, the axis of rotation of the comminuting and mixing tool preferably is disposed on a straight line connecting the center of the ground-plane of the receptacle with the center of the ground-plane projection of the inlet opening of the screw-type extruder. In order to achieve an adaptation to different kinds of the material to be processed, within the spirit of the invention the eccentricity of the axis of rotation of the comminuting and mixing tool can be varied. For this purpose, within the spirit of the invention the axis of rotation of the comminuting and mixing tool may be guided in a slot-like guide of the bottom of the receptacle and may be connected to displacing means, for example a handwheel, disposed on the outer wall of the receptacle. Thereby an adjustment of the position of the rotating tool in the receptacle can be done also during operation.

BRIEF DESCRIPTION OF THE DRAWING

In the accompanying drawing, embodiments of the inventive apparatus are schematically shown by way of examples.

FIG. 2 shows a top view onto a slightly amended embodiment in direction of the arrow II of FIG. 1.

FIG. 3 shows a further embodiment in which the rotating tool is bearingly disposed eccentrically within the receptacle.

FIGS. 4 and 5 show sections according to the lines IV—IV and V—V, respectively, of FIG. 3.

FIG. 6 shows a varied embodiment to FIG. 2.

DESCRIPTION OF THE PREFERRED EMBODIMENTS

Figure 1:
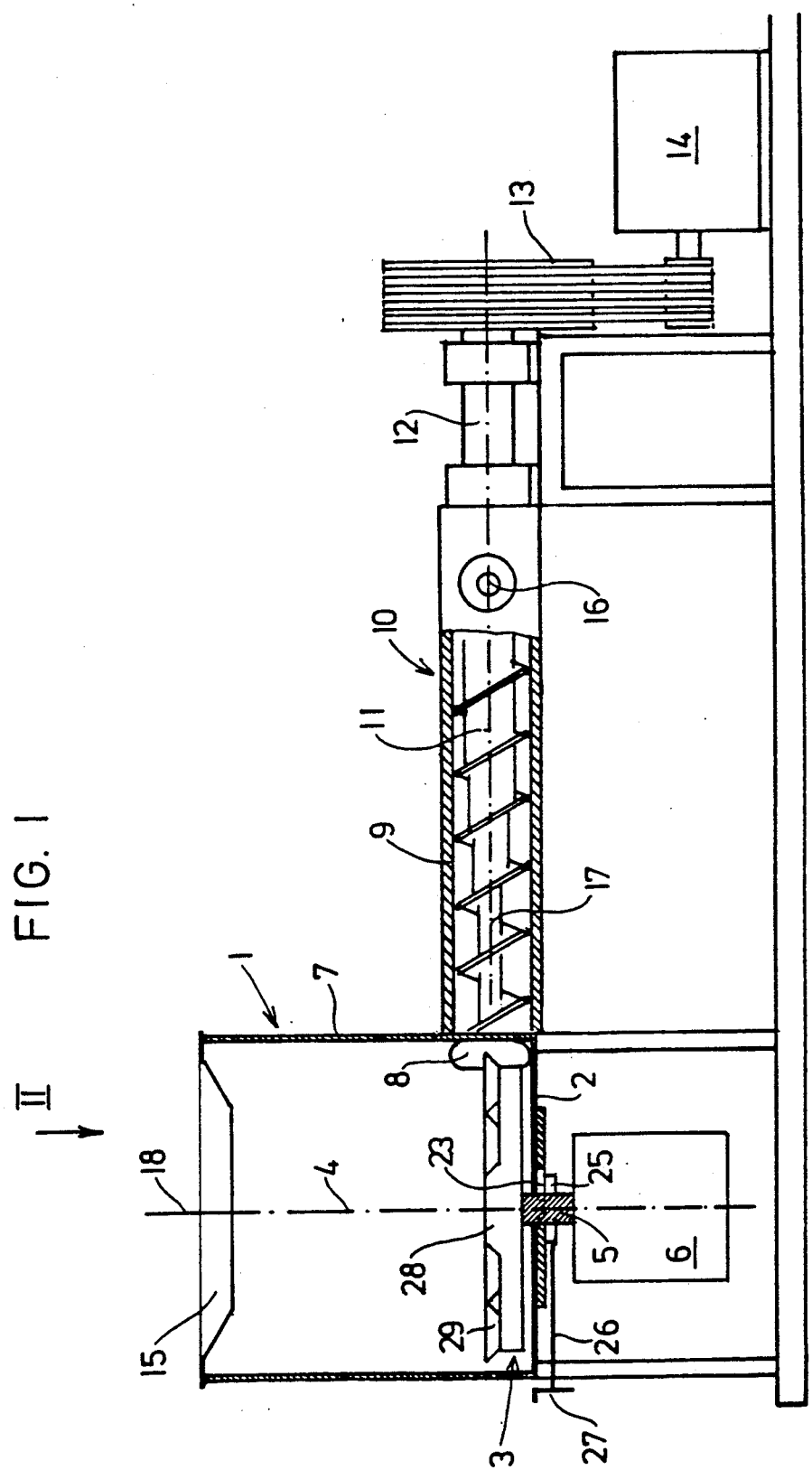
FIG. 1 shows a vertical section through the apparatus.

The apparatus according to FIG. 1 for processing synthetic plastics material comprises a receptacle 1 which is tightly closed to below by a bottom 2. In the region of the bottom a comminuting and mixing tool 3 is disposed for rotation around a vertical axis 4, which tool is driven via a shaft 5 by a motor 6 disposed within a hollow space below the bottom 2. At the level of this comminuting and mixing tool 3 an opening 8 is provided in the side wall 7 of the receptacle 1, to which opening the housing 9 of a screw-type extruder 10 is connected. Within the housing 9 an extruder screw 11 is beared for rotation, which screw is driven via a shaft 12 and a V-belt gearing 13 by a motor 14. The material to be comminuted is introduced into the receptacle 1 through a charging hopper 15 and is comminuted and mixed by the rotating tool 3 and is forced by this tool into the opening 8 where the comminuted material is grasped by the screw 11 an is pressed out through an exit opening 16 leading from the housing 9 laterally. The inner diameter of the housing 9 of the screw-type extruder 10 may have equal diameter over its total length, however, it may also be enlarged like a funnel in the region of its end neighbouring the intake opening 8 (FIG. 2,3), this facilitating introducing of the material. In this case also the screw 11 is conically enlarged in this section. The core diameter of the screw may be equal everywhere, however, it is also possible, as FIG. 1 shows, to vary this core diameter between the single threads of the screw, suitably enlarged stepwisely in direction towards the exit opening 16 in order to increase the pressure exerted onto the material to be extruded through the exit opening 16. Neither the housing 9 of the screw-type extruder 10 nor its screw 11 protrude from the inner wall of the receptacle 1 into its interior so that the circulation of the tool 3 is not hindered and no dead corners are formed. It is suitable to make the housing 9 and the front end of the screw 11 flush with the contour of the inner wall of the receptacle 1, however, its is also possible to slightly offset the front of the screw 11 relative to this contour.

The axis 17 of the screw-type extruder 10 or its thought extension, respectively, does not extend radially with respect to the axis 18 of the receptacle 1 (which axis coincides with the axis 4 of rotation of the tool 3 in the working position shown in FIG. 1), but is laterally offset relative to this radial direction 19 (FIGS. 2,3), and this in the sense opposite to the moving direction of the comminuting and mixing tool 3 passing by the opening 8, the sense of circulation of this tool 3 being indicated by an arrow 20. This lateral offset is designated in FIGS. 2 and 3 by v. This offset has as a consequence that the component S (FIG. 2) of the peripheral force U exerted by the rotating tool 3 and acting in axial direction of the screw 11 is increased in comparison to an embodiment in which the axis 17 of the screw (FIGS. 2,3) coincides with the said radial direction 19. In this connection, the peripheral force U is measured in that point in which the axis 17 of the screw meets the circular periphery of the receptacle 1, thus in the inlet opening 8 of the screw-type extruder. The amount of this offset v is about between 5 and 35, preferably between 15 and 25% of the radius of the receptacle 1, which corresponds to an angle-measured offset with respect to the radial direction 19 of about 5 to 20, preferably about 10° to 15° (measured opposite to the direction of arrow 20).

In order to assist pressing in of the synthetic plastics material comminuted by the rotating tool 3 into the screw-type extruder 10 it is further suitable to dispose the axis 4 around which this tool 3 circulates, eccentrically with respect to the axis 18 of the receptacle 1, and this in direction towards the intake opening 8 of the screw-type extruder 10. This eccentricity is designated in FIG. 3 by e. By this eccentricity it is achieved (see FIGS. 4, 5), that that area $F_1$ (FIG. 5) or $F_2$ (FIG. 4), respectively, which lies between the side wall of the receptacle 1 and the periphery of the rotating comminuting and mixing tool 3, in the region of the inlet opening 8 of the screw-type extruder 10 is substantially smaller (area $F_2$, FIG. 4) than at the opposing side of the receptacle 1 (area $F_1$, FIG. 5). The pressure acting on the comminuted synthetic plastics material, therefore, increases during the circulation movement of the comminuting and mixing tool 3, starting from that side of the receptacle 1 situated opposite the intake opening, until this pressure in the region of the intake opening 8 reaches a maximum. During the second half of the circulation movement this pressure decreases again and reaches a minimum at the starting point, that means at that place of the receptacle 1 which is most far from the inlet opening 8. The ratio $F_1:F_2$ is suitably about 1.3 to 2, in dependence from the compressibility of the synthetic plastics material to be processed. The amount of the eccentricity e can easily be calculated on this ratio if the profile of the comminuting and mixing tool 3 and of the receptacle 1, respectively, is known.

Since the kind of the material to be processed or its compressibility are not always pre-known or do not remain constant, respectively, it is of advantage to make the amount of the eccentricity e variable or adjustable. As FIG. 1 shows, for this purpose the shaft 5 of the comminuting and mixing tool 3 is displacable along a straight line 24 (FIG. 3) connecting the axis 18 of the receptacle 1 with the center point 22 (FIG. 3) of the ground plane of the inlet opening 8. For this purpose, the shaft 5 is slidably guided in a longitudinal slot 23 (FIG. 1) in the bottom 2 of the receptacle 1, the longitudinal axis of this longitudinal slot 23 lies on the mentioned straight line 24 (FIG. 3) connecting the axis 18 with the center point 22. For fixing the position of the shaft 5 in the longitudinal slot 23 there is provided a ring 25 surrounding the shaft 5, which ring is connected to a spindle 26 which can be rotated by means of a handwheel 27 which can be actuated from the outer side of the side wall 7 of the receptacle 1. A rotation of the spindle 26 causes a shift of the ring 25 and thus of the shaft 5 in the longitudinal slot 23. In order to avoid that material to be comminuted escapes downwardly from the receptacle 1 through those portions of the longitudinal slot 23 which are not filled by the shaft 5, the ring 25 can be dimensioned correspondingly large or a sufficient big cover plate (not shown) can be connected to the shaft 5 above the slot 23, which cover plate covers the remaining sections of the longitudinal slot 23.

Within the embodiment according to FIGS. 2 to 5 the comminuting and mixing tool 3 is formed by a substantially circular carrier disk 28 circulating around the axis 4, on which disk knives 29 are fixed which are only indicated in FIGS. 4 and 5. However, it is more favourable to provide the carrier disk 28 with radial arms 30 carrying the knives 29. As FIG. 6 shows, the working edges 31 of the knives 29 are formed according to an angle so that the free ends of these working edges 31 are backwardly offset, when seen in direction of rotation of the tool 3. Thereby a spatula-like action on the comminuted material is achieved which assists to press in this material in the region of the inlet opening 8 into the screw-type extruder 10.

We claim:

1. An apparatus for processing synthetic plastic materials comprising:
    a receptacle having a bottom wall, a side wall, and a substantially vertical axis;
    a rotating tool disposed within the receptacle, said rotating tool disposed adjacent said bottom wall and adapted to rotate in a rotation direction about a rotation axis substantially parallel to said vertical axis; and
    an output device adapted to remove processed material from said receptacle, said output device including an output housing attached to an opening defined in said side wall and a output screw disposed within said output housing, said output device being substantially disposed on the exterior of the receptacle;
    said output housing having a longitudinal axis intersecting said receptacle at a point, said point and said rotation axis of said rotating tool defining a first radius therebetween;
    said first radius being offset by an angle of between approximately 5° and 20° relative to a second radius, said second radius being parallel to the longitudinal axis of said output housing, said offset angle being in the opposite direction relative to said rotation direction;
    whereby said output device is filled with processed material by a component of a peripheral vector, measured in an axial direction of said output screw.

2. An apparatus according to claim 1 wherein said side wall is cylindrically-shaped, and wherein said rotation axis is disposed eccentrically within said receptacle.

3. An apparatus according to claim 2 further comprising means for varying the eccentricity of said rotation axis.

4. An apparatus according to claim 1 wherein said rotating tool is a comminuting and mixing tool.

5. An apparatus according to claim 1 wherein said output screw is an extruder screw having a longitudinal axis substantially parallel to the longitudinal axis of said output housing.

6. An apparatus according to claim 1 wherein said first radius is offset by at an angle of between approximately 10° and 15° relative to said second radius.

7. An apparatus according to claim 3 wherein said means comprises a handwheel adapted to slidably displace said rotation axis within a longitudinal slot defined in said bottom wall.

* * * * *